(12) United States Patent
Biswal et al.

(10) Patent No.: US 10,950,229 B2
(45) Date of Patent: Mar. 16, 2021

(54) CONFIGURABLE SPEECH INTERFACE FOR VEHICLE INFOTAINMENT SYSTEMS

(71) Applicant: HARMAN INTERNATIONAL INDUSTRIES, INCORPORATED, Stamford, CT (US)

(72) Inventors: Rajesh Biswal, Bangalore (IN); Arindam Dasgupta, Kolkata (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/687,387

(22) Filed: Aug. 25, 2017

(65) Prior Publication Data

US 2018/0061410 A1    Mar. 1, 2018

Related U.S. Application Data

(60) Provisional application No. 62/380,307, filed on Aug. 26, 2016.

(51) Int. Cl.
*G10L 15/22* (2006.01)
*G10L 15/06* (2013.01)
*G10L 15/18* (2013.01)
*G06F 3/0482* (2013.01)
*G06F 3/16* (2006.01)

(52) U.S. Cl.
CPC ............ *G10L 15/22* (2013.01); *G06F 3/0482* (2013.01); *G06F 3/167* (2013.01); *G10L 15/063* (2013.01); *G10L 15/1822* (2013.01); *G10L 2015/0635* (2013.01); *G10L 2015/223* (2013.01)

(58) Field of Classification Search
CPC ....... G10L 15/00; G10L 15/265; G10L 15/20; G10L 17/005; G10L 25/30; H05K 999/99
See application file for complete search history.

(56) References Cited

U.S. PATENT DOCUMENTS

| | | | |
|---|---|---|---|
| 6,587,824 B1 * | 7/2003 | Everhart | G10L 15/07 704/243 |
| 8,718,797 B1 * | 5/2014 | Addepalli | H04W 4/046 700/17 |
| 8,819,182 B2 * | 8/2014 | Howarter | G06F 21/6218 709/219 |
| 9,229,905 B1 * | 1/2016 | Penilla | G06F 17/00 |

(Continued)

*Primary Examiner* — Anne L Thomas-Homescu
(74) *Attorney, Agent, or Firm* — Artegis Law Group, LLP

(57) ABSTRACT

A voice command application allows a user to configure an infotainment system to respond to customized voice commands. The voice command application exposes a library of functions to the user which the infotainment system can execute via interaction with the vehicle. The voice command application receives a selection of one or more functions and then receives a speech sample of the voice command. The voice command application generates sample metadata that includes linguistic elements of the voice command, and then generates a command specification. The command specification indicates the selected functions and the sample metadata for storage in a database. Subsequently, the voice command application receives the voice command from the user and locates the associated command specification in the database. The voice command application then extracts the associated set of functions and causes the vehicle to execute those functions to perform vehicle operations.

19 Claims, 11 Drawing Sheets

(56) References Cited

U.S. PATENT DOCUMENTS

| | | | | |
|---|---|---|---|---|
| 9,389,831 | B2* | 7/2016 | Parundekar | G06F 3/167 |
| 9,530,414 | B2* | 12/2016 | Zhao | G10L 15/22 |
| 9,536,197 | B1* | 1/2017 | Penilla | B60L 58/12 |
| 9,641,678 | B2* | 5/2017 | Berry | H04M 3/4936 |
| 9,661,006 | B2* | 5/2017 | Kantor | H04L 63/1408 |
| 9,672,823 | B2* | 6/2017 | Penilla | H04L 67/12 |
| 9,680,963 | B2* | 6/2017 | Danne | G06F 3/167 |
| 9,747,898 | B2* | 8/2017 | Ng-Thow-Hing | G02B 27/01 |
| 9,779,723 | B2* | 10/2017 | Panainte | H04R 1/08 |
| 9,952,680 | B2* | 4/2018 | Ricci | H04W 4/21 |
| 2003/0065427 | A1* | 4/2003 | Funk | G01C 21/3608 |
| | | | | 701/1 |
| 2004/0167674 | A1* | 8/2004 | Voeller | G01B 21/26 |
| | | | | 700/279 |
| 2005/0171664 | A1* | 8/2005 | Konig | G10L 15/22 |
| | | | | 701/36 |
| 2005/0179540 | A1* | 8/2005 | Rubenstein | B60R 16/0373 |
| | | | | 340/539.18 |
| 2005/0197767 | A1* | 9/2005 | Nortrup | G01C 21/3667 |
| | | | | 701/420 |
| 2007/0100520 | A1* | 5/2007 | Shah | G07C 5/008 |
| | | | | 701/31.4 |
| 2007/0124044 | A1* | 5/2007 | Ayoub | G06F 21/10 |
| | | | | 701/36 |
| 2007/0124046 | A1* | 5/2007 | Ayoub | G06F 21/10 |
| | | | | 701/36 |
| 2008/0103779 | A1* | 5/2008 | Huang | G10L 15/28 |
| | | | | 704/275 |
| 2009/0112605 | A1* | 4/2009 | Gupta | B60R 16/0373 |
| | | | | 704/275 |
| 2009/0192795 | A1* | 7/2009 | Cech | B60R 11/02 |
| | | | | 704/233 |
| 2011/0071734 | A1* | 3/2011 | Van Wiemeersch | G08C 17/02 |
| | | | | 701/49 |
| 2011/0093545 | A1* | 4/2011 | Papadopol | B60R 16/0373 |
| | | | | 709/206 |
| 2011/0131037 | A1* | 6/2011 | Huang | B60R 16/0373 |
| | | | | 704/10 |
| 2011/0257973 | A1* | 10/2011 | Chutorash | G01C 21/3661 |
| | | | | 704/235 |
| 2012/0041638 | A1* | 2/2012 | Johnson | G07C 5/008 |
| | | | | 701/33.1 |
| 2012/0183221 | A1* | 7/2012 | Alasry | G10L 15/06 |
| | | | | 382/181 |
| 2012/0260164 | A1* | 10/2012 | Scheufler | B60K 35/00 |
| | | | | 715/702 |
| 2013/0134730 | A1* | 5/2013 | Ricci | H04W 4/90 |
| | | | | 296/24.34 |
| 2013/0154298 | A1* | 6/2013 | Ricci | B60R 11/0229 |
| | | | | 296/37.12 |
| 2013/0244634 | A1* | 9/2013 | Garrett | G06F 9/445 |
| | | | | 455/418 |
| 2013/0325450 | A1* | 12/2013 | Levien | G10L 21/00 |
| | | | | 704/201 |
| 2013/0342337 | A1* | 12/2013 | Kiefer | G08B 6/00 |
| | | | | 340/438 |
| 2014/0066132 | A1* | 3/2014 | Burke | H04L 67/12 |
| | | | | 455/569.2 |
| 2014/0277937 | A1* | 9/2014 | Scholz | G06F 7/00 |
| | | | | 701/36 |
| 2014/0282931 | A1* | 9/2014 | Protopapas | G06F 21/31 |
| | | | | 726/5 |
| 2014/0303839 | A1* | 10/2014 | Filev | G06F 3/0481 |
| | | | | 701/36 |
| 2014/0306814 | A1* | 10/2014 | Ricci | H04W 4/21 |
| | | | | 340/425.5 |
| 2014/0306833 | A1* | 10/2014 | Ricci | B60Q 1/00 |
| | | | | 340/901 |
| 2014/0309789 | A1* | 10/2014 | Ricci | B60Q 1/00 |
| | | | | 700/276 |
| 2014/0309813 | A1* | 10/2014 | Ricci | B60Q 1/00 |
| | | | | 701/2 |
| 2014/0309864 | A1* | 10/2014 | Ricci | H04W 4/21 |
| | | | | 701/36 |
| 2014/0337469 | A1* | 11/2014 | Bang-Olsen | H04W 4/00 |
| | | | | 709/217 |
| 2014/0365228 | A1* | 12/2014 | Ng-Thow-Hing | G02B 27/01 |
| | | | | 704/275 |
| 2014/0379334 | A1* | 12/2014 | Fry | G10L 15/22 |
| | | | | 704/235 |
| 2015/0006182 | A1* | 1/2015 | Schmidt | G10L 15/30 |
| | | | | 704/275 |
| 2015/0006184 | A1* | 1/2015 | Marti | G10L 25/63 |
| | | | | 704/275 |
| 2015/0142449 | A1* | 5/2015 | Haslinger | B60R 16/0373 |
| | | | | 704/275 |
| 2015/0178034 | A1* | 6/2015 | Penilla | B60L 11/1822 |
| | | | | 345/1.1 |
| 2015/0179184 | A1* | 6/2015 | Cudak | G10L 21/0208 |
| | | | | 704/233 |
| 2015/0192423 | A1* | 7/2015 | Van Wiemeersch | G01C 21/36 |
| | | | | 701/2 |
| 2015/0199965 | A1* | 7/2015 | Leak | G10L 15/22 |
| | | | | 704/249 |
| 2015/0202962 | A1* | 7/2015 | Habashima | B60K 35/00 |
| | | | | 345/633 |
| 2015/0203125 | A1* | 7/2015 | Penilla | G06F 21/445 |
| | | | | 701/1 |
| 2015/0210287 | A1* | 7/2015 | Penilla | B60W 40/08 |
| | | | | 701/49 |
| 2015/0289119 | A1* | 10/2015 | Singhal | H04M 1/72577 |
| | | | | 455/466 |
| 2015/0309784 | A1* | 10/2015 | Molin | G06F 8/65 |
| | | | | 701/71 |
| 2015/0339031 | A1* | 11/2015 | Zeinstra | B60K 37/06 |
| | | | | 715/747 |
| 2015/0370446 | A1* | 12/2015 | Zhang | G06F 16/44 |
| | | | | 715/716 |
| 2015/0379987 | A1* | 12/2015 | Panainte | H04R 1/08 |
| | | | | 704/246 |
| 2016/0034238 | A1* | 2/2016 | Gerlach | G06F 3/04817 |
| | | | | 345/1.1 |
| 2016/0042735 | A1* | 2/2016 | Vibbert | G10L 15/1822 |
| | | | | 704/257 |
| 2016/0066004 | A1* | 3/2016 | Lieu | H04N 21/2541 |
| | | | | 725/29 |
| 2016/0070527 | A1* | 3/2016 | Ricci | G06F 3/165 |
| | | | | 715/716 |
| 2016/0104486 | A1* | 4/2016 | Penilla | H04L 67/12 |
| | | | | 704/232 |
| 2016/0111089 | A1* | 4/2016 | Kim | G10L 15/22 |
| | | | | 704/239 |
| 2016/0112517 | A1* | 4/2016 | Wilson | B60W 50/085 |
| | | | | 717/178 |
| 2016/0117162 | A1* | 4/2016 | Searle | H04L 41/082 |
| | | | | 717/173 |
| 2016/0196131 | A1* | 7/2016 | Searle | H04L 41/082 |
| | | | | 717/173 |
| 2016/0196132 | A1* | 7/2016 | Searle | H04L 41/082 |
| | | | | 717/173 |
| 2016/0202966 | A1* | 7/2016 | Vangelov | G06F 8/654 |
| | | | | 717/172 |
| 2016/0210131 | A1* | 7/2016 | Vangelov | G06F 8/65 |
| 2016/0224316 | A1* | 8/2016 | Mitchell | G06F 17/2229 |
| 2016/0240189 | A1* | 8/2016 | Lee | G06F 3/167 |
| 2016/0291940 | A1* | 10/2016 | Searle | H04L 41/082 |
| 2016/0291959 | A1* | 10/2016 | Searle | H04L 41/082 |
| 2016/0294605 | A1* | 10/2016 | Searle | H04L 41/082 |
| 2016/0294614 | A1* | 10/2016 | Searle | G06F 8/654 |
| 2016/0306624 | A1* | 10/2016 | Vangelov | G06F 8/654 |
| 2016/0313902 | A1* | 10/2016 | Hill | G06F 3/04847 |
| 2016/0328244 | A1* | 11/2016 | Ahmed | G06F 3/0482 |
| 2016/0335051 | A1* | 11/2016 | Osawa | G10L 15/22 |
| 2016/0342406 | A1* | 11/2016 | Ahmed | G06F 9/451 |
| 2016/0379631 | A1* | 12/2016 | Wang | B60N 2/0232 |
| | | | | 704/275 |
| 2017/0018273 | A1* | 1/2017 | Chowdhury | G10L 15/20 |
| 2017/0063994 | A1* | 3/2017 | Lei | B60L 58/12 |

(56) References Cited

U.S. PATENT DOCUMENTS

| | | | |
|---|---|---|---|
| 2017/0072794 A1* | 3/2017 | Buttolo | B60K 35/00 |
| 2017/0090594 A1* | 3/2017 | Borghi | G06F 3/03549 |
| 2017/0103749 A1* | 4/2017 | Zhao | G10L 15/22 |
| 2017/0108935 A1* | 4/2017 | Ricci | H04W 4/21 |
| 2017/0123757 A1* | 5/2017 | Lancaster | B60R 16/0373 |
| 2017/0124035 A1* | 5/2017 | Buttolo | G06F 3/0482 |
| 2017/0140757 A1* | 5/2017 | Penilla | H04L 67/12 |
| 2017/0140777 A1* | 5/2017 | Amman | G10L 15/01 |
| 2017/0147074 A1* | 5/2017 | Buttolo | B60Q 3/20 |
| 2017/0162191 A1* | 6/2017 | Grost | G10L 15/075 |
| 2017/0166056 A1* | 6/2017 | Buttolo | B60K 37/06 |
| 2017/0169823 A1* | 6/2017 | Neff | G10L 15/22 |
| 2017/0169825 A1* | 6/2017 | Huang | G10L 15/30 |
| 2017/0197636 A1* | 7/2017 | Beauvais | B60W 30/06 |
| 2017/0200449 A1* | 7/2017 | Penilla | H04L 67/12 |
| 2017/0213550 A1* | 7/2017 | Ali | G10L 15/20 |
| 2017/0236511 A1* | 8/2017 | Zhao | G10L 15/01 704/240 |
| 2017/0247000 A1* | 8/2017 | Ricci | G06K 9/00302 |
| 2017/0261255 A1* | 9/2017 | Saikkonen | B60K 35/00 |
| 2017/0270924 A1* | 9/2017 | Fleurence | B60Q 3/80 |
| 2017/0286785 A1* | 10/2017 | Schaffer | B60K 35/00 |
| 2017/0287232 A1* | 10/2017 | Devdutt | G07C 5/008 |
| 2017/0291114 A1* | 10/2017 | Hsu | A63H 17/36 |
| 2017/0291544 A1* | 10/2017 | Ishihara | B60Q 9/00 |
| 2017/0323635 A1* | 11/2017 | Zhao | G06F 3/167 |
| 2017/0334457 A1* | 11/2017 | Park | G06Q 10/10 |
| 2017/0336920 A1* | 11/2017 | Chan | G06Q 10/10 |
| 2018/0033429 A1* | 2/2018 | Makke | G10L 15/22 |
| 2018/0059913 A1* | 3/2018 | Penilla | B60N 2/0228 |
| 2018/0061410 A1* | 3/2018 | Biswal | G10L 15/22 |
| 2018/0061415 A1* | 3/2018 | Penilla | H04L 67/12 |
| 2018/0075164 A1* | 3/2018 | Haase | G06F 17/30985 |
| 2018/0096681 A1* | 4/2018 | Ni | G10L 15/063 |
| 2018/0096684 A1* | 4/2018 | Goote | G10L 15/22 |
| 2018/0096685 A1* | 4/2018 | Huang | G10L 15/30 |
| 2018/0176741 A1* | 6/2018 | Cremer | H04W 4/024 |
| 2018/0246641 A1* | 8/2018 | Glaser | B60K 37/06 |
| 2018/0261217 A1* | 9/2018 | Mitra | B60R 16/0373 |
| 2018/0350364 A1* | 12/2018 | Park | G10L 15/22 |
| 2018/0350365 A1* | 12/2018 | Lee | G10L 15/22 |

* cited by examiner

CONFIGURABLE SPEECH INTERFACE FOR VEHICLE INFOTAINMENT SYSTEMS

CROSS-REFERENCE TO RELATED APPLICATIONS

This application claims the benefit of United States provisional patent application titled "Configurable Speech Interface," filed on Aug. 26, 2016 and having Ser. No. 62/380,307. The subject matter of this related application is hereby incorporated herein by reference.

BACKGROUND

Field of the Disclosed Embodiments

The disclosed embodiments relate generally to infotainment systems, and more specifically to a configurable speech interface for vehicle infotainment systems and other smart devices.

Description of the Related Art

Modern vehicles often include an infotainment system. An infotainment system generally refers to a system that provides occupants of a vehicle with various information and entertainment options. For example and without limitation, a conventional infotainment system could provide navigation information to the driver of the vehicle while also playing music.

A conventional infotainment system may expose a speech interface that allows the user to issue voice commands to the infotainment system. Conventional speech interfaces are preconfigured by the original equipment manufacturers (OEMs) of the infotainment system with a fixed library of voice commands. Each voice command causes the infotainment system to execute one specific, predetermined vehicle operation. For example and without limitation, the user could say the words, "unlock door," and the infotainment system would then cause the door to unlock automatically. Although helpful to users, such conventional speech interfaces generally suffer from the following drawbacks.

First, the user of the infotainment system initially does not know any particular voice command for causing the infotainment system to perform a specific vehicle operation. Typically, the user has to read the user manual and memorize a table of voice commands in order to interact effectively with the infotainment system via the speech interface.

Second, conventional infotainment systems generally tolerate only modest variations in the pronunciation of voice commands included in the library of voice commands. Consequently, a user who speaks with an accent may have difficulty interacting with the infotainment system via the speech interface.

Third, because the library of voice commands is fixed, there can only be slight, if any, variations in wording or grammar of spoken voice commands. In practice, a vehicle firmware update is typically required to allow the speech interface to recognize additional words and/or alternative grammatical constructions.

Fourth, because the library of voice commands is fixed, the speech interface cannot initiate vehicle operations that are not specified in the initial library of voice commands. Again, a vehicle firmware upgrade is typically required to add new voice commands for initiating additional vehicle operations to the library of voice commands.

As the foregoing illustrates, a more effective approach for configuring a vehicle infotainment system would be useful.

SUMMARY

One or more embodiments set forth include a computer-implemented method for configuring a vehicle infotainment system to initiate one or more vehicle operations in response to a voice command, including querying a database to obtain a library of vehicle functions, where each vehicle function, when executed, causes a subsystem within a vehicle to perform a corresponding vehicle operation, receiving a selection of a first set of vehicle functions from the library of vehicle functions, receiving a first speech sample associated with a user, identifying a first linguistic element included in the first speech sample, and generating a voice command specification that includes the first set of vehicle functions and the first linguistic element.

At least one advantage of the disclosed techniques is that because the user of the voice command application personally generates the voice command specifications, the user is naturally familiar with what voice commands are available and need not consult a manual to learn those commands. Another advantage is that because the voice commands are specified based on speech samples gathered directly from the user, the voice command application is able to recognize those commands with a greater degree of accuracy compared to conventional speech interfaces.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosed embodiments subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As discussed above, conventional infotainment systems may include a speech interface that can initiate a vehicle operation in response to a spoken voice command. However, conventional speech interfaces suffer from a number of limitations that may cause various problems for the user. To address these problems, various embodiments include a voice command application that allows the user to flexibly configure an infotainment system to perform a wide range of vehicle operations in response to customized voice commands.

System Overview

Figure 1:
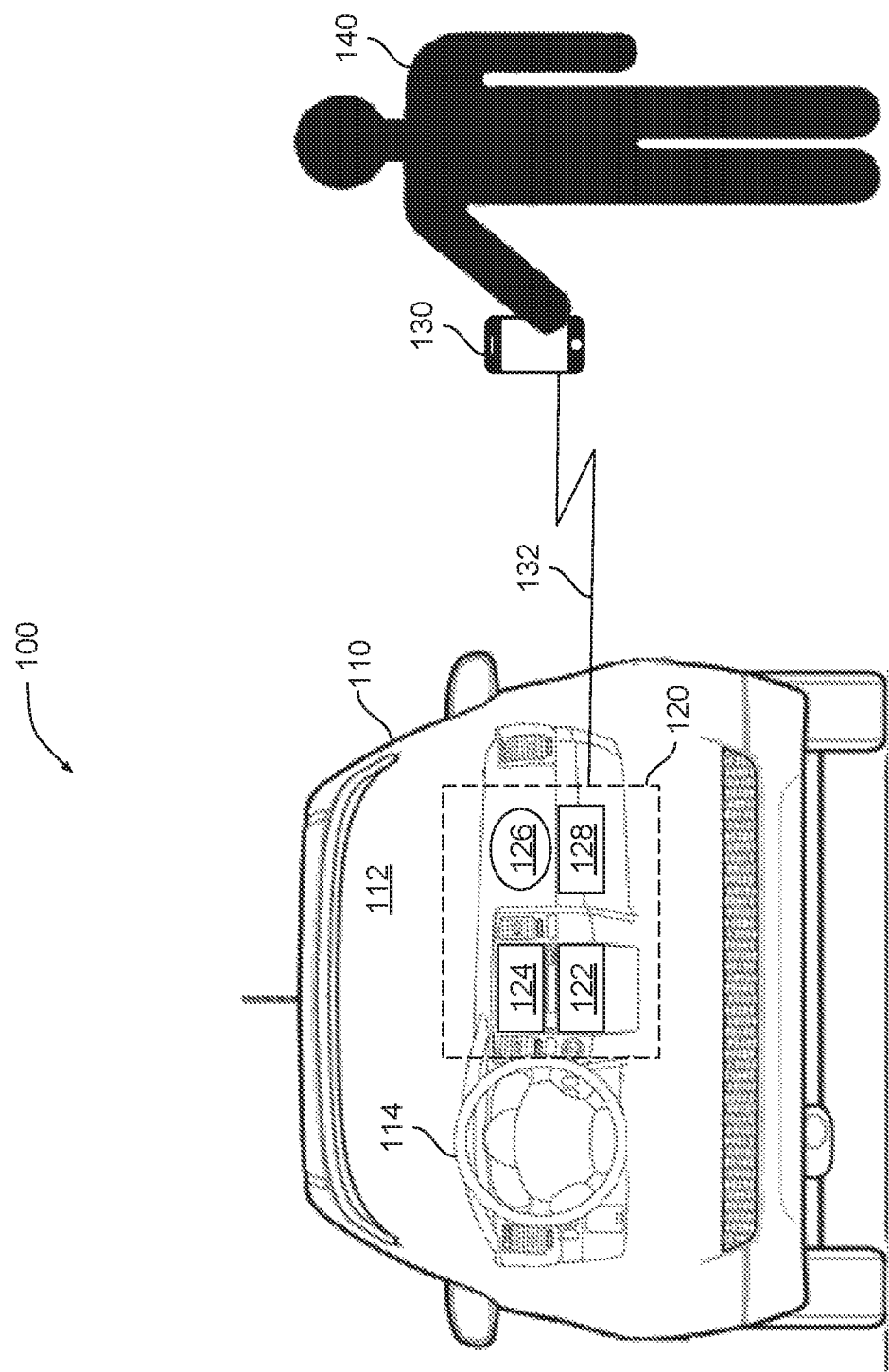
FIG. 1 illustrates a system configured to implement one or more aspects of the various embodiments.

FIG. 1 illustrates a system configured to implement one or more aspects of the various embodiments. As shown, a cutaway view 100 of a vehicle 110 reveals various components included within vehicle 110. In particular, vehicle 110 includes a windshield 112, a steering wheel 114, and an infotainment system 120. Infotainment system 120 provides information to occupants of vehicle 110, including navigation information, among other things. Infotainment system 120 also provides entertainment to occupants of vehicle 110, including music and other forms of media content. Infotainment system 120 includes a computing device 122, a display 124, a speaker 126, and a microphone 128. Infotainment system 120 is configured to interoperate with a mobile device 130 via a wireless connection 132 or another form of connection, including wired connections. Wireless connection 132 may be a Bluetooth® connection, among other types of wireless connections. Mobile device 130 may be associated with a user 140.

Infotainment system 120 and mobile device 130 interoperate via execution of a voice command application. The voice command application may reside on either or both of infotainment system 120 and mobile device 130. The voice command application allows user 140 to configure infotainment system 120 to respond to human vocalizations, including words, phrases and sentences which user 140 may produce. These vocalizations are referred to herein as "voice commands." In response to a given voice command, infotainment system 120 initiates a set of vehicle operations. For example, and without limitation, user 140 could configure infotainment system 120 to recognize and respond to the statement "prepare for rain." When user 140 says this particular sequence of words, the voice command application could close the windows of vehicle 110, close the sunroof, and activate the windshield wipers of vehicle 110. The voice command application is described in greater detail below in conjunction with FIGS. 2-9.

Figure 2:
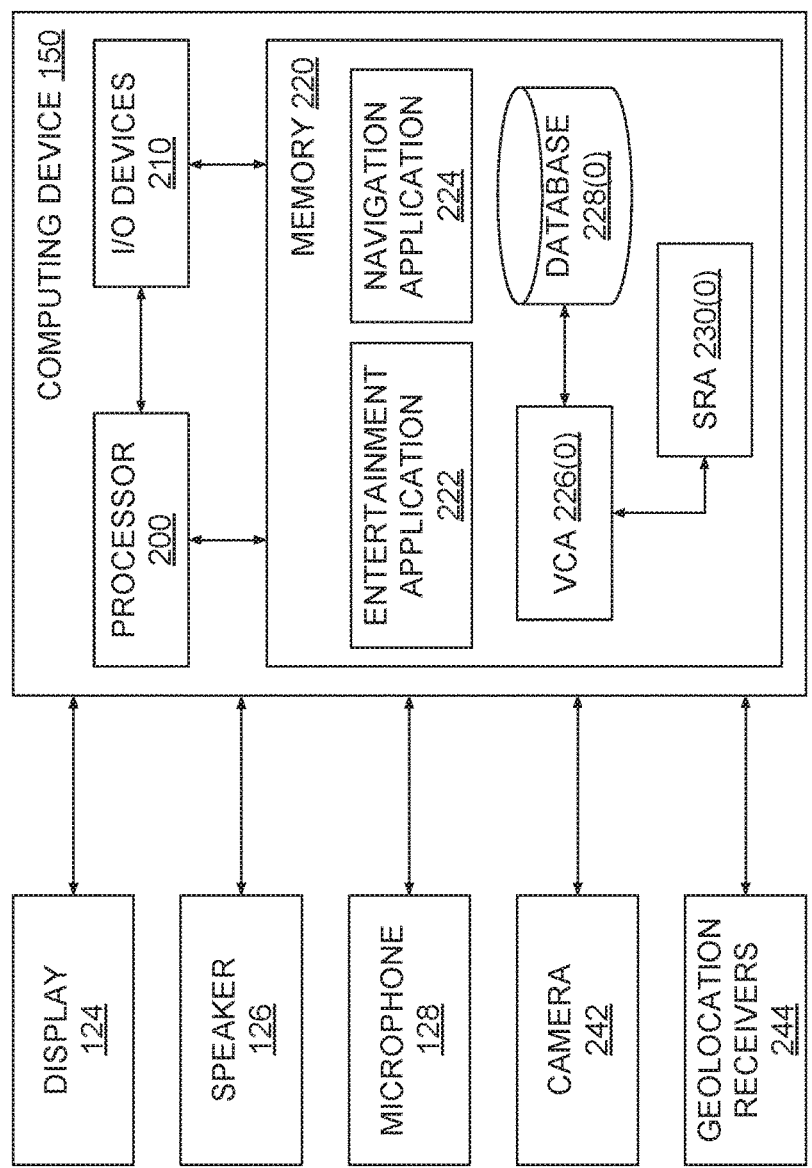
FIG. 2 is a more detailed illustration of the infotainment system of FIG. 1, according to various embodiments.

FIG. 2 is a more detailed illustration of infotainment system of FIG. 1, according to various embodiments. As shown, infotainment system 120 includes computing device 122 coupled to peripheral components 240. Peripheral components 240 include display 124, speaker 126, microphone 128, cameras 242 and a geolocation receiver 244. Computing device 122 includes a processor 200, input/output (I/O) devices 210, and memory 220, coupled together. Computing device 122 may also include a vehicle interface (not shown here) that allows communications with subsystems of vehicle 110.

Processor 200 may be any technically device configured to process data and execute software applications. For example, and without limitation, processor 200 could be a central processing unit (CPU), a graphics processing unit (GPU), a digital signal processor (DSP), and any combination thereof. I/O devices 210 include devices for receiving input, devices for producing output, and devices that both receive input and produce output. For example, and without limitation, I/O devices 210 could include a keyboard, a speaker, and/or a touchscreen, among other possibilities. Memory 220 may be any technically feasible storage medium configured to store data and software applications. For example, and without limitation, memory 220 could include a hard disk and/or random access memory (RAM) coupled together.

Memory 220 includes an entertainment application 222, a navigation application 224, a voice command application (VCA) 226(0), a database 228(0), and a speech recognition application (SRA) 230(0). Memory 200 may also include other application related to cellular communications, climate control, telematics, and remote seat entertainment, among others. When executed by processor 200, entertainment application 222 outputs media content to occupants of vehicle 110, including user 140, via display 124 and speakers 126. For example, and without limitation, entertainment application 222 could play a film via display 124 and output the soundtrack to the film via speakers 126.

When executed by processor 200, navigation application 224 outputs driving directions to the driver of vehicle 110 via display 124 and speakers 126. For example, and without limitation, navigation application 224 could display a map showing a route to a selected destination, and also output driving instructions via speaker 126. Navigation application 224 may perform navigation operations based on geolocation data generated by geolocation receiver 244. In one embodiment, vehicle 110 is a self-driving car, and navigation application 224 is capable of piloting vehicle 110 without driver intervention. In doing so, navigation application 224 may rely on video data captured by camera 242.

VCA 226(0) is a software program that, when executed by processor 200, allows user 140 to configure infotainment system 120 to respond to customized voice commands. VCA 226(0) stores voice command specifications in database 228(0). VCA 226(0) also interoperates with SRA 230(0) in order to convert audio samples of human vocalizations into metadata indicating the specific words, phrases, or sentences spoken. VCA 226(0) may interoperate with a companion voice command application that resides on mobile device 130. Mobile device 130 is described in greater detail below in conjunction with FIG. 3.

Figure 3:
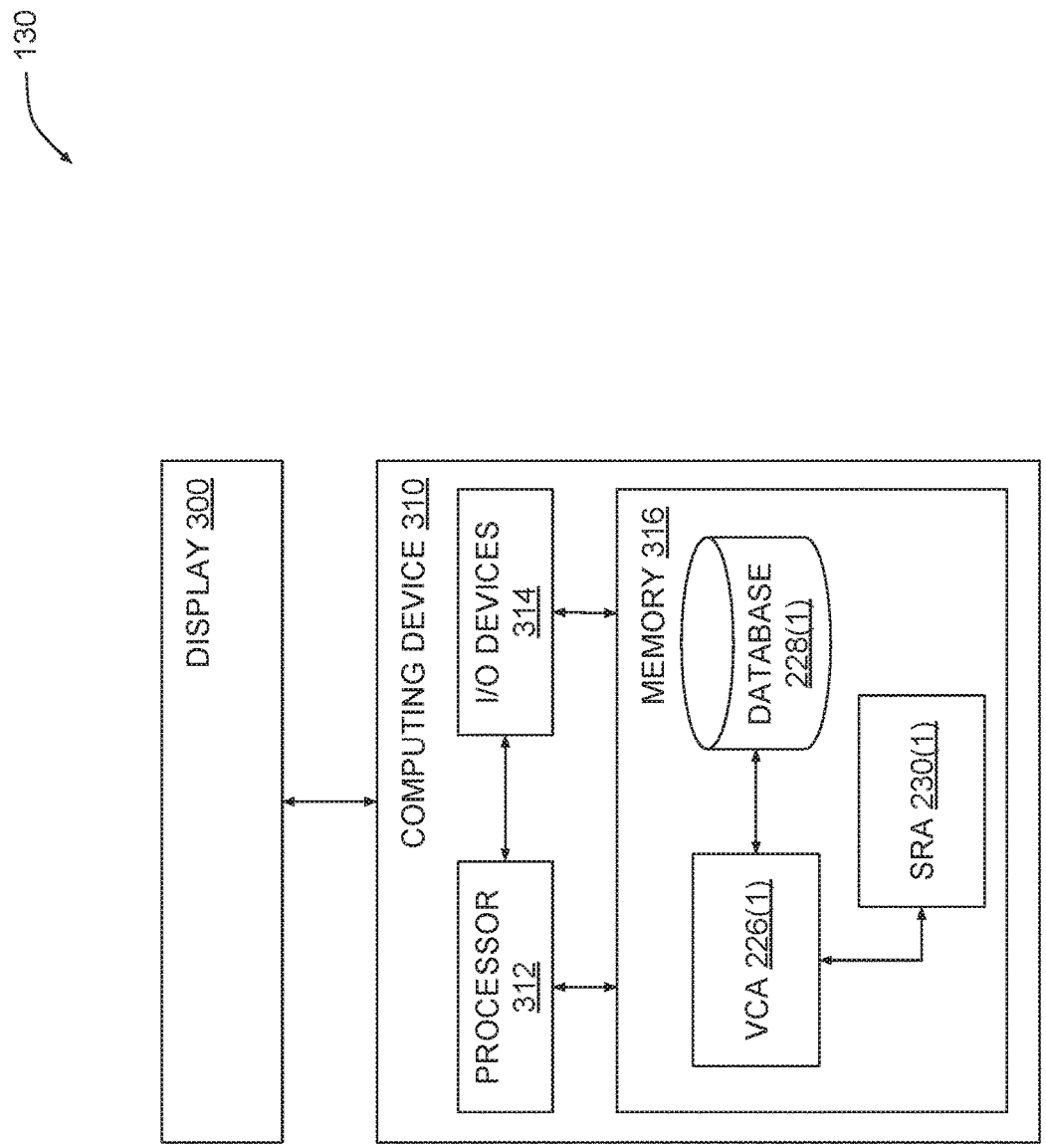
FIG. 3 is a more detailed illustration of the mobile device of FIG. 1, according to various embodiments.

FIG. 3 is a more detailed illustration of the mobile device of FIG. 1, according to various embodiments. As shown, mobile device 130 includes a display 300 coupled to a computing device 310. Display 300 may be a touchscreen, among other possibilities. Computing device 310 includes a processor 312, I/O devices 314, and a memory 316.

Processor 312 may be any technically device configured to process data and execute software applications, including a CPU, a GPU, a DSP, and any combination thereof. I/O devices 314 include devices for receiving input, devices for producing output, and devices that both receive input and produce output. Memory 316 may be any technically feasible storage medium configured to store data and software applications. For example, and without limitation, memory 316 could include a hard disk and RAM coupled together.

Memory 316 includes a VCA 226(1), database 228(1), and SRA 230(1). VCA 226(1) may perform similar operations as VCA 226(0) shown in FIG. 2, and/or may interoperate with VCA 226(0). As a general matter, VCAs 226(0) and 226(1) collectively represent a distributed software entity that may reside within one or both of computing devices 122 and 310. Accordingly, for the sake of simplicity, VCAs 226(0) and 226(1) are collectively referred to hereinafter as VCA 226.

Database 228(1) may store similar data as database 228(0) shown in FIG. 2 and may interoperate with database 228(0) to collectively store data in a distributed manner. As a general matter, databases 228(0) and 228(1) collectively represent a distributed storage entity that may reside within one or both of computing devices 122 and 310. Accordingly, for the sake of simplicity, databases 228(0) and 228(1) are collectively referred to hereinafter as database 228.

SRA 230(1) may perform similar operations as SRA 230(0) shown in FIG. 2 and/or may interoperate with SRA 230(0). As a general matter, SRA 230(0) and 230(1) collectively represent a distributed software entity that may reside within one or both of computing devices 122 and 310. Accordingly, for the sake of simplicity, SRAs 230(0) and 230(1) are collectively referred to hereinafter as SRA 230.

VCA 226, database 228, and SRA 230 are configured to interoperate with one another to configure infotainment system 120 to respond to customized voice commands on behalf of user 140. Infotainment system 120 recognizes these customized voice commands and, in response to a given voice command, causes vehicle 110 to perform a set of functions associated with the voice command. Each such function may correspond to a specific vehicle operation. VCA 226, database 228, and SRA 230 are discussed in greater detail below in conjunction with FIGS. 4-5.

Software Overview

Figure 4:
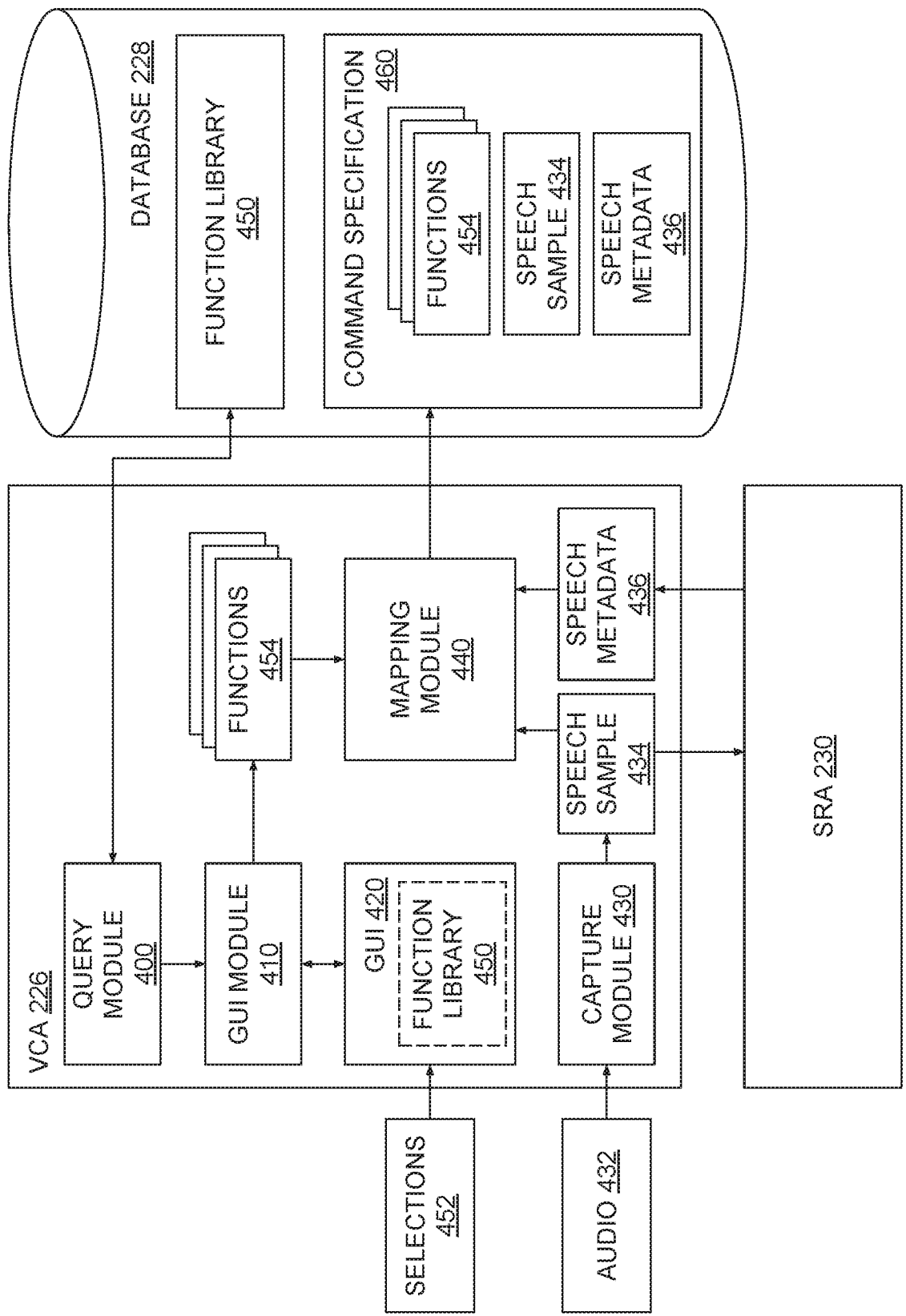
FIG. 4 is a more detailed illustration of the voice control application of FIGS. 2-3, according to various embodiments.

FIG. 4 is a more detailed illustration of the voice control application of FIGS. 2-3, according to various embodiments. As shown, VCA 226 includes a query module 400, a graphical user interface (GUI) module 410, a GUI 420, a capture module 430, and a mapping module 440. As also shown, database 228 includes a function library 450 and a command specification 460. VCA 226 and database 228 may also include other software modules and data, although the specific modules and data shown in FIG. 4 are directly involved with VCA 226 configuring infotainment system 120 to respond to a customized voice command.

To configure infotainment system 120 to respond to a custom voice command, query module 400 first accesses function library 450 from database 228. Function library 450 includes a library of functions that can be executed to initiate a wide variety of vehicle operations. For example, and without limitation, function library 450 could include functions that, when executed, cause the doors of vehicle 110 to lock or unlock, cause the ignition of vehicle 110 to start or stop, cause infotainment system 120 to play a specific song or play a specific genre of music, cause a climate control system within vehicle 110 to raise the temperature within vehicle 110, and so forth. The functions included within function library 450 are generally specified by the OEM of vehicle 110 or the OEM of infotainment system 120. Query module 400 copies function library 450 (or extracts all functions included therein) and passes the library (or functions) to GUI module 410.

GUI module 410 generates GUI 420 and then causes a display device to output GUI 420. GUI 420 may be displayed via infotainment system 120 or via mobile device 130, depending on the particular architecture with which VCA 226 is deployed. For example, and without limitation, VCA 226 could be deployed as an application (app) executing on mobile device 130, and this app could render GUI 420 on display 300. FIGS. 6-9 illustrate various architectural options for VCA 226 and, additionally, database 228 and SRA 230. GUI 420 exposes a selection interface to user 140 that allows user 140 to select between the different functions included in function library 450. Again, each function corresponds to a particular vehicle operation. GUI module 410 receives selections 452 of specific functions from user 140 via GUI 420. Then, GUI module 410 outputs the selected functions, shown as functions 454, to mapping module 440.

GUI module 410 then configures capture module 430 to capture audio 432 from user 140 to generate speech sample 434. For example, and without limitation, GUI module 420 could cause GUI 420 to display a "record" button that, when selected by user 140, causes capture module 430 to record audio 432 via microphone 128 and then save that audio as speech sample 434. In one embodiment, audio capture may be initiated via a "push to talk" button included on steering wheel 114 that, when pressed, causes a message to be transmitted to infotainment system 120 over a vehicle network, thereby causing infotainment system 120 to record audio 432 and generate speech sample 434. Speech sample 434 may include any technically feasible form of sound, although generally audio 432 represents a vocalization generated by user 140. That vocalization may include one or more words, phrases, or sentences, and typically assumes the form of a command for performing some vehicle operation. Each vehicle operation involves the execution of one or more functions included in function library 450. Capture module 430 transmits speech sample 434 to SRA 230.

SRA 230 implements speech recognition algorithms to map speech sample 434 to set of discrete linguistic elements. SRA 230 includes these discrete linguistic elements in speech metadata 436. Speech metadata 436 may thus include individual words, phrases, sentences, phonemes, graphemes, or compressed audio signature(s). For example, and without limitation, speech sample 434 could include a .wav file of user 140 stating "prepare for traffic," and speech metadata 436 would, in turn, include a Unicode string of the individual letters included in the written statement "prepare for traffic."

Mapping module 440 collects speech sample 434 and speech metadata 436 and also obtain functions 454 previously selected by user 140. Mapping module 440 then generates a mapping between speech metadata 436 and functions 454 by generating command specification 460. Command specification 460 is a data structure that associates speech metadata 436 (and speech sample 434) to functions 454. Database 228 may store any number of command specifications 460, each of which represents a different voice command and the specific set of vehicle functions that should be performed in response to that voice command.

Figure 5:
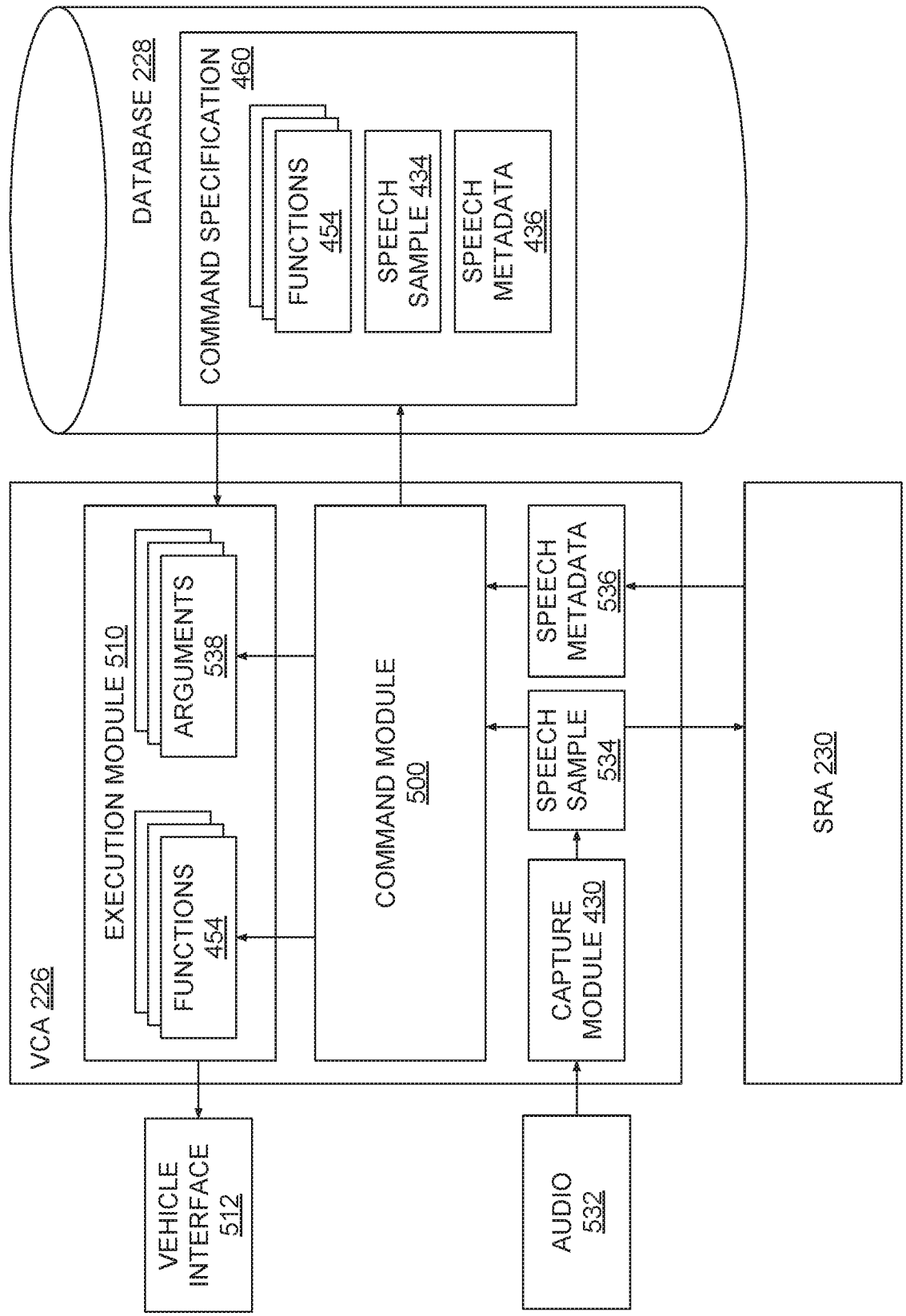
FIG. 5 is a more detailed illustration of the voice control application of FIGS. 2-3, according to various other embodiments.

In summary, FIG. 4 illustrates how VCA 226 configures infotainment system 120 to respond to a customized voice command by generating a command specification that represents the voice command. FIG. 5, on the other hand, illustrates how VCA 226 initiates vehicle operations based on the customized voice command.

FIG. 5 is a more detailed illustration of the voice control application of FIGS. 2-3, according to various other embodiments. As shown, VCA 226 includes a command module 500 and an execution module 510. The specific software modules and data shown in FIG. 5 are directly involved with VCA 226 initiating vehicle operations based on the voice command discussed above in conjunction with FIG. 4. Some of the previously discussed modules and data have been omitted for clarity.

In operation, VCA 226 receives audio 532 from user 140. Audio 532 is a vocalization produced by user 140 and, like audio 432, may represent a command for performing one or more vehicle operations. Capture module 430 records audio 532 and generates speech sample 534 based on that audio. SRA 430 then processes speech sample 534 to generate speech metadata 436. Speech metadata 536 includes discrete linguistics elements associated with audio 532 and/or speech sample 534.

Based on speech metadata 536, command module 500 searches database 228 to locate a specific command specification with speech metadata that matches speech metadata 536. Command module 500 may perform a fuzzy string search, phonetic search, or other form of search technique to identify a closest match between speech metadata 536 and another speech metadata. In the exemplary scenario discussed herein, command module 500 determines that speech metadata 536 most closely matches speech metadata 436 discussed above in conjunction with FIG. 4. Command module 500 extracts functions 454 from command specification 460 and outputs these functions to execution module 510.

In one embodiment, command module 500 also outputs arguments 538 to execution module 510 based on speech metadata 536. Arguments 538 represent portions of speech metadata 536 that are permitted to vary. For example, and without limitation, speech metadata 536 could represent the phrase "increase temperature 5 degrees." Here, the "5 degrees" portions of speech metadata 536 may vary to indicate other numbers of degrees. User 140 could state "increase temperature 10 degrees" and command module 500 would map the associated speech metadata to the same command specification as when user 140 states "increase temperature 5 degrees." However, the arguments portion of that metadata may vary.

Execution module 510 initiates the execution of functions 454 with arguments 538 as inputs, if available. In doing so, execution module 510 may interact with a vehicle interface 512 included in infotainment system 120 to perform the associated vehicle operations with various vehicle subsystems. A vehicle subsystem could include, for example and without limitation, a door locking mechanism, a sunroof mechanism, a turn signal circuit, and so forth. Execution module 510 may also interact with an operating system (OS) executing on infotainment system 120 or firmware executing on an onboard computing device within vehicle 110. In one embodiment, each function 454 includes program code that is executable by a processing unit to perform the associated vehicle operation.

Referring generally to FIGS. 4-5, these figures illustrate how VCA 226, database 228, and SRA 230 interoperate to configure infotainment system 100 to respond to customized voice commands. In response to a given voice command, infotainment system 120 initiates one or multiple vehicle operations. Multiple vehicle operations may be performed in conjunction with one another, either serially or in parallel. The above-described techniques may also be adapted to update existing voice commands. As discussed previously, each of VCA 226, database 228, and SRA 230 may represent distributed entities configured to reside on one or both of infotainment system 120 and mobile device 130. FIGS. 6-9 set forth alternative deployment options for distributing these entities.

Alternative Deployment Options

Figure 6:
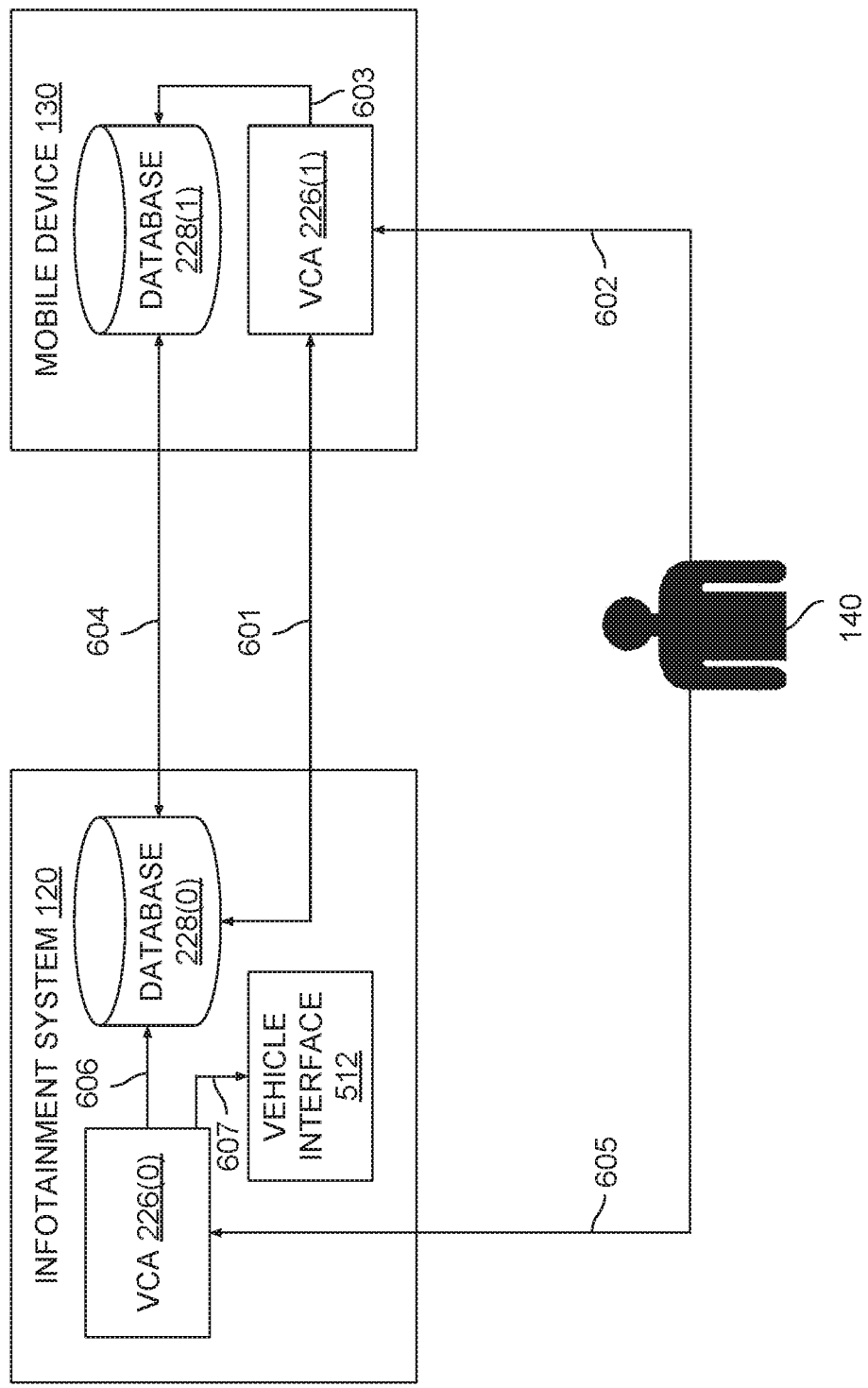
FIG. 6 illustrates the voice control application of FIGS. 2-3 when distributed between the infotainment system and the mobile device of FIG. 1, according to various embodiments.

FIG. 6 illustrates the voice control application of FIGS. 2-3 when distributed between the infotainment system and the mobile device of FIG. 1, according to various embodiments. As shown, VCA 226(0) and database 228(0) may reside in infotainment system 120 while VCA 226(1) and database 228(1) reside in mobile device 130. This arrangement is also shown in FIGS. 2-3.

When configuring infotainment system 120 to respond to a new voice command, VCA 226(1) queries database 228(0) to acquire function library 450 via pathway 601. Then, VCA 226(1) receives a selection of vehicle functions from user 140 via pathway 602. VCA 226(1) also obtains an audio sample of the voice command from user 140 via pathway 602. VCA 226(1) then generates a command specification 460 and stores the specification in database 228(1) via pathway 603.

To execute one or more functions in response the new voice command, database 228(1) and 228(0) synchronize via pathway 604. This action could occur when mobile device 130 establishes wireless connection 132 (or a wired connection) with infotainment system 120. VCA 226(0) may then receive an audio sample of the voice command from user 140 via pathway 605. VCA 226(0) identifies the previously generated command specification within database 228(0) via pathway 606, and then executes the associated functions using vehicle interface 512 via pathway 607.

Figure 7:
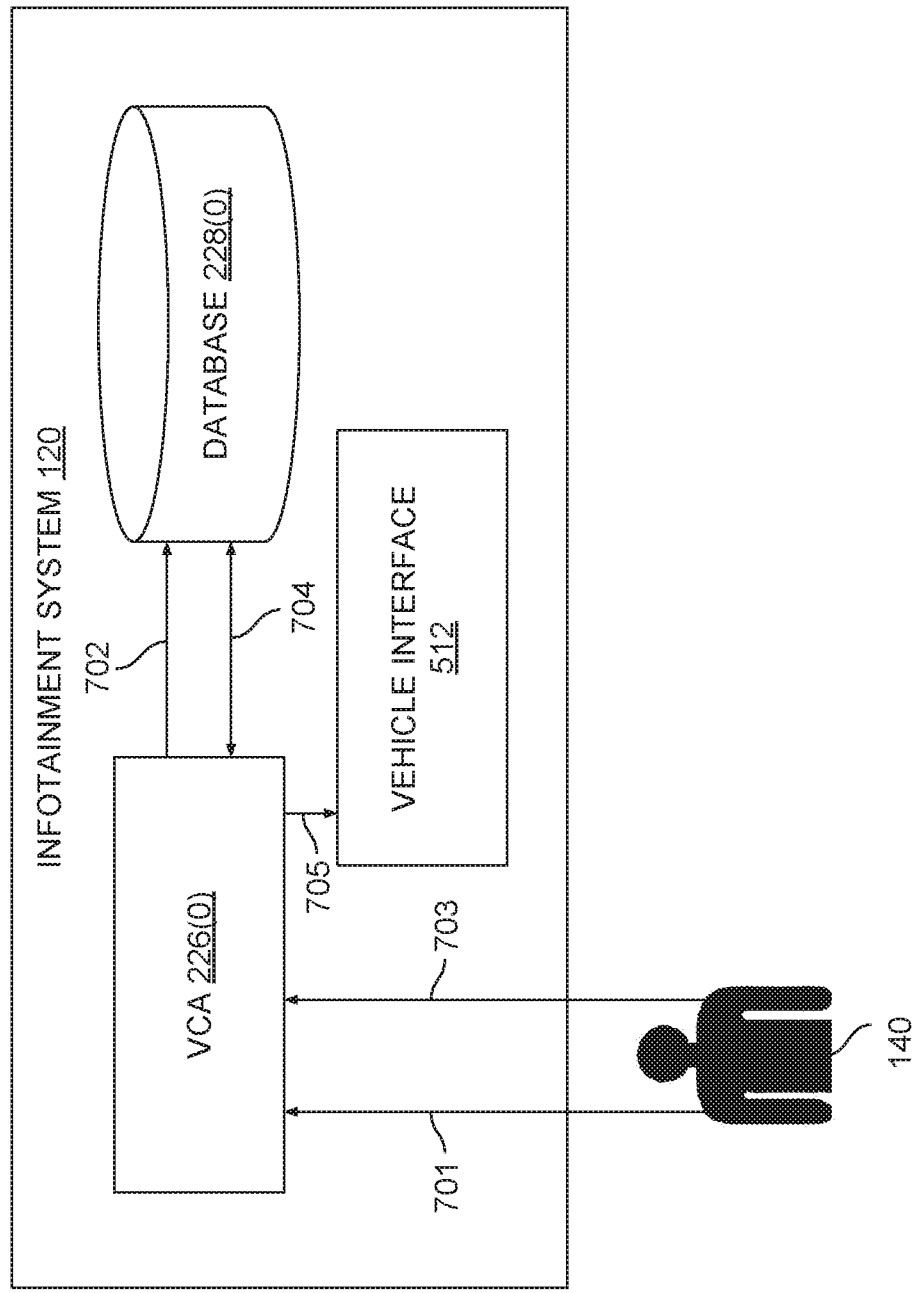
FIG. 7 illustrates voice control application of FIGS. 2-3 when localized to the infotainment system of FIG. 1, according to various embodiments.

FIG. 7 illustrates voice control application of FIGS. 2-3 when localized to the infotainment system of FIG. 1, according to various embodiments. As shown, VCA 226(0) and database 228(0) reside in infotainment system 120 and perform all functionality discussed thus far for configuring and executing voice commands. Mobile device 130 need not be involved in this embodiment.

When configuring infotainment system 120 to respond to a new voice command, VCA 226(0) receives selection of vehicle functions and audio sample of a voice command from user 140 via pathway 701. VCA 226(0) then generates a command specification and stores the specification in database 228(0) via pathway 702. To execute one or more functions in response to the new voice command, VCA 226(0) receives an audio sample of the voice command from user 140 via pathway 703. VCA 226(0) then locates the associated command specification in database 228(0) via pathway 704. VCA 226(0) then initiates execution of the associated functions using vehicle interface 512 via pathway 705.

Figure 8:
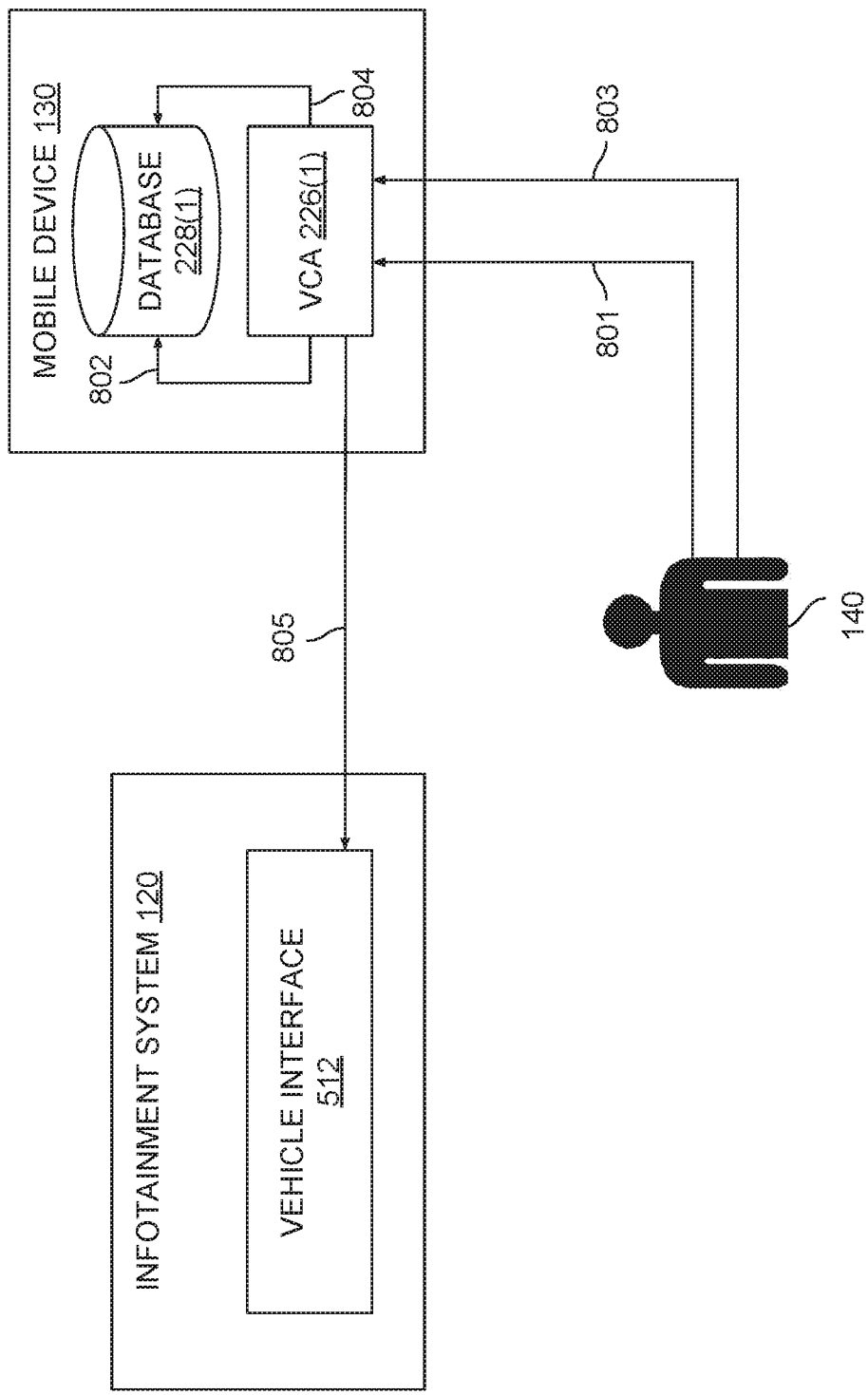
FIG. 8 illustrates the voice control application of FIGS. 2-3 when localized to the mobile device of FIG. 1, according to various embodiments.

FIG. 8 illustrates the voice control application of FIGS. 2-3 when localized to the mobile device of FIG. 1, according to various embodiments. As shown, VCA 226(1) and database 228(1) reside in mobile device 130 and perform all functionality discussed thus far for configuring and executing voice commands. Infotainment system 120 may have limited operational capacity in this embodiment.

To execute one or more functions in response to a new voice command, VCA 226(1) receives a selection of vehicle functions and an audio sample of the voice command from user 140 via pathway 801. In one embodiment, infotainment system 120 receives the audio sample via an alternate pathway (not shown) and then transmits the audio sample to VCA 226(1). This alternate pathway may be used to capture the audio sample when infotainment system 120 is paired with mobile device 130 and configured to capture audio on behalf of mobile device 130. VCA 226(1) may be preconfigured with function library 450, or may extract this library via vehicle interface 512. VCA 226(1) then generates a command specification and stores the specification in database 228(1) via pathway 802. To execute one or more functions in response to the new voice command, VCA 226(1) receives an audio sample of the command from user 140 via pathway 803. VCA 226(1) then locates the associated command specification in database 228(1) via pathway 804. VCA 226(1) then initiates execution of the associated functions using vehicle interface 512 via pathway 805.

This particular embodiment may be advantageously implemented in order to provide configurability of voice commands to infotainment systems that do not natively provide a speech interface. In this embodiment, VCA 226(1) coordinates all speech recognition and processing as well as command specification generation and function execution, with limited reliance on infotainment system 120.

Figure 9:
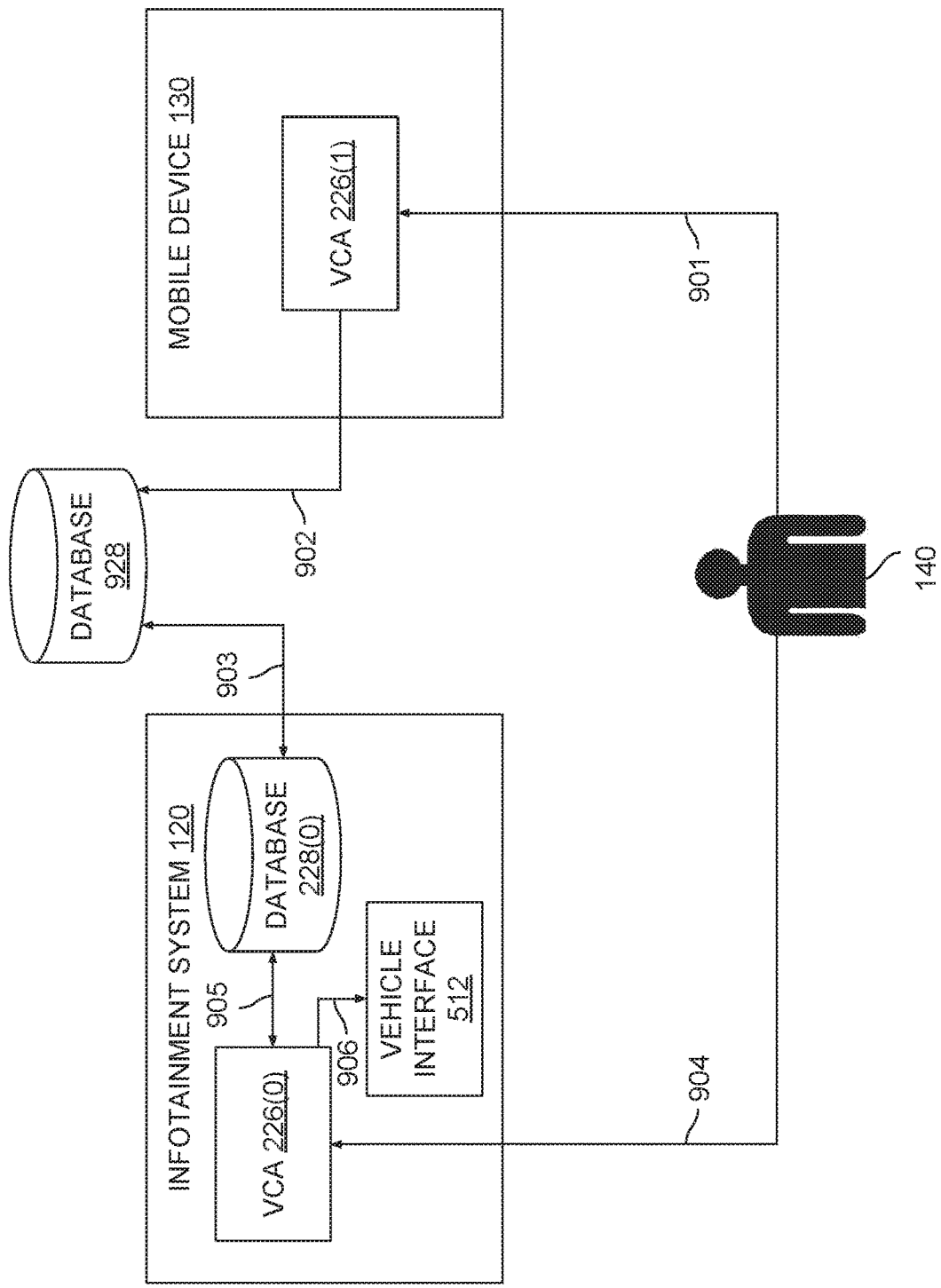
FIG. 9 illustrates the distributed voice control application of FIGS. 2-3 interacting with a cloud-based database, according to various embodiments.

FIG. 9 illustrates the distributed voice control application of FIGS. 2-3 interacting with a cloud-based database, according to various embodiments. As shown, VCA 226(0) and database 228(0) reside within infotainment system 120 and VCA 226(1) resides within mobile device 130. Database 228(1) is absent from this embodiment. Instead, a cloud-based database 928 provides a communication channel between VCA 226(1) and VCA 226(0).

When configuring infotainment system 120 to respond to a new voice command, VCA 226(0) receives selection of vehicle functions and an audio sample of the voice command from user 140 via pathway 901. VCA 226(0) then generates a command specification and stores the specification in database 928 via pathway 902. Database 928 may synchronize with database 228(0) via pathway 903 at any time. To execute one or more functions in response to the new voice command, VCA 226(1) receives an audio sample of the command from user 140 via pathway 904. VCA 226(1) then locates the associated command specification in database 228(0) via pathway 905. VCA 226(0) then initiates execution of the associated functions using vehicle interface 512 via pathway 906.

Referring generally to FIGS. 6-9, persons skilled in the art will understand that the various deployment options shown are provided for exemplary purposes and should not limit the scope of the claimed embodiments in any way.

Specifying and Executing Voice Commands

Figure 10:
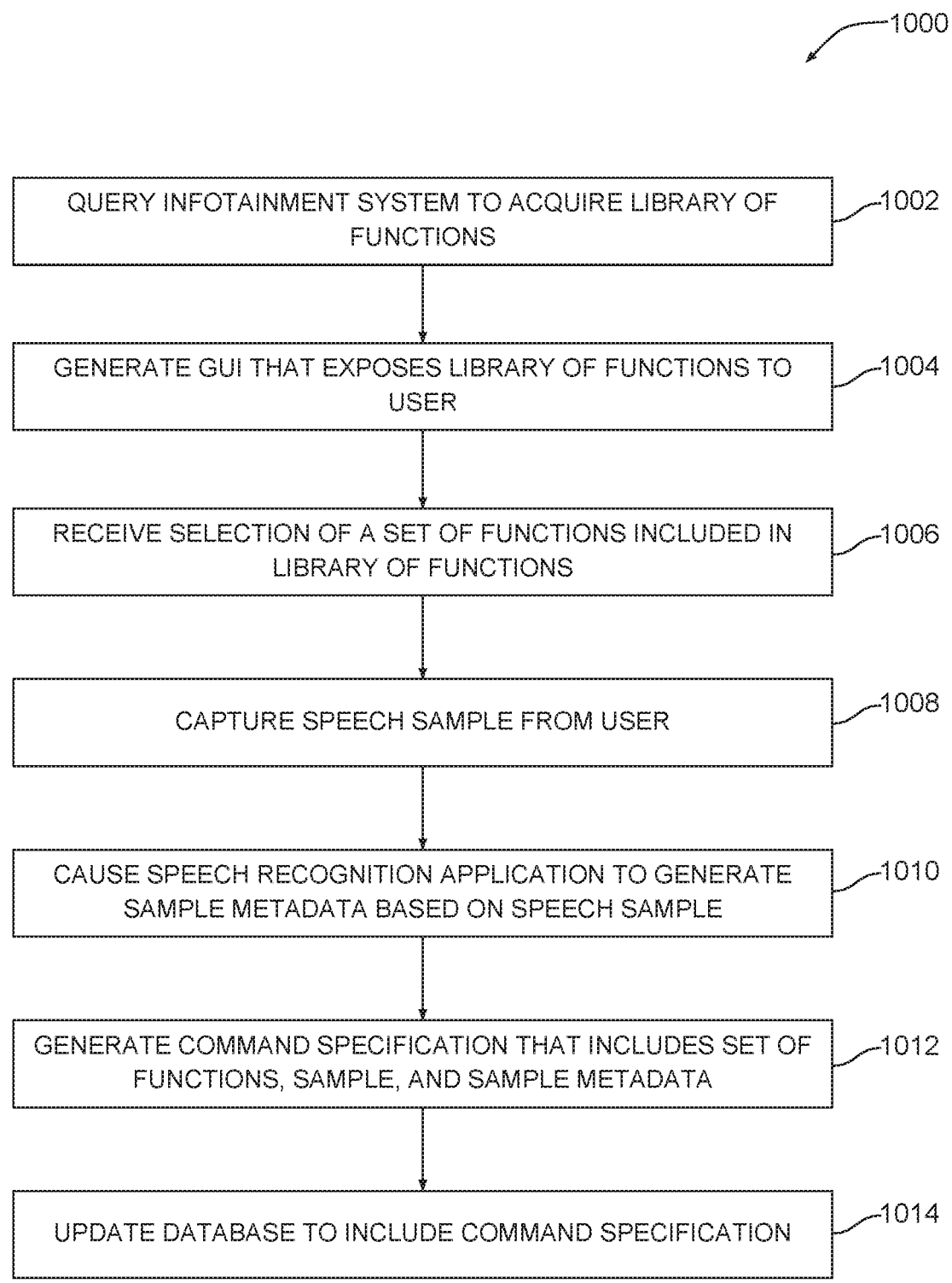
FIG. 10 is a flow diagram of method steps for specifying a voice command to control an in-vehicle infotainment system, according to various embodiments.

FIG. 10 is a flow diagram of method steps for specifying a voice command to control an in-vehicle infotainment system, according to various embodiments. Although the method steps are described in conjunction with the systems of FIGS. 1-9, persons skilled in the art will understand that any system configured to perform the method steps, in any order, is within the scope of the disclosed embodiments.

As shown, a method 1000 begins at step 1002, where VCA 226 queries infotainment system 120 to acquire a library of functions that can be executed by vehicle 110. At step 1004, VCA 226 generates a GUI that exposes the library of functions to user 140 for selection. The GUI could be displayed on display 124 of infotainment system 120 or display 300 of mobile device 130, for example and without limitation. At step 1006, VCA 226 receives a selection of a set of functions included in the library of functions via the GUI.

At step 1008, VCA 226 captures a speech sample from user 140. The speech sample generally reflects a vocalization of a voice command. At step 1010, VCA 226 causes SRA 230 to generate sample metadata based on the speech sample. SRA 230 may execute on infotainment system 120, mobile device 130, or both, in various embodiments. The sample metadata generated by SRA 230 indicates discrete linguistic elements associated with the vocalized command.

Figure 11:
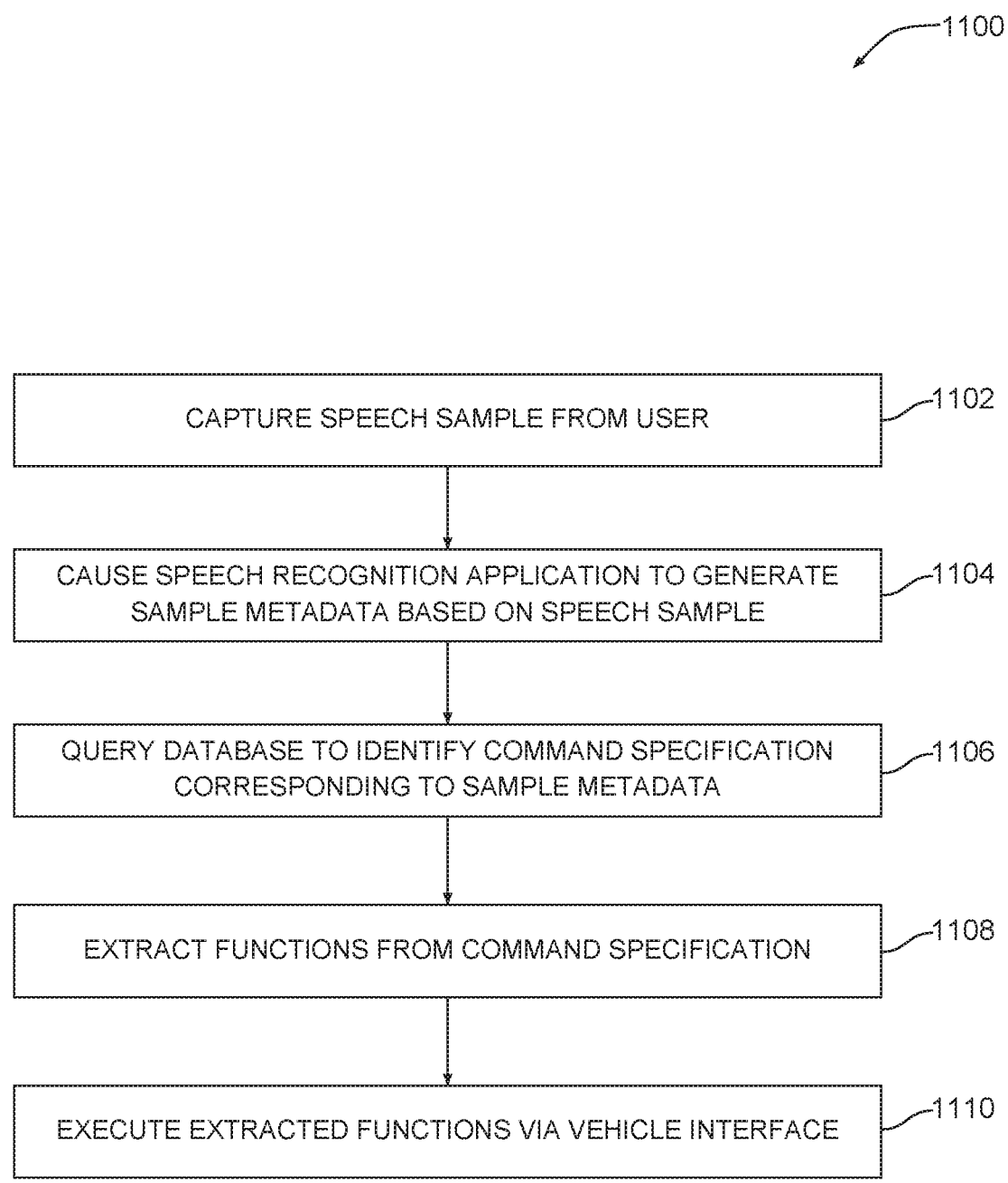
FIG. 11 is a flow diagram of method steps for causing an in-vehicle infotainment system to perform one or more operations in response to a voice command, according to various embodiments.

At step 1012, VCA 226 generates a command specification that includes the selected set of functions, the audio sample, and the sample metadata. At step 1014, VCA 226 updates database 228 to include the command specification. Subsequently, user 140 may initiate the set of functions associated with the voice command by vocalizing the command again. FIG. 11 illustrates how VCA 226 executes a previously configured voice command.

FIG. 11 is a flow diagram of method steps for causing an in-vehicle infotainment system to perform one or more operations in response to a voice command, according to various embodiments. Although the method steps are described in conjunction with the systems of FIGS. 1-9, persons skilled in the art will understand that any system configured to perform the method steps, in any order, is within the scope of the disclosed embodiments.

As shown, a method 1100 begins at step 1102, where VCA 226 captures a speech sample from user 140. The speech sample represents a vocalization produced by user 140 to express a voice command. At step 1104, VCA 226 causes SRA 230 to generate sample metadata based on the speech sample. The sample metadata specifies linguistics elements included in the sample, such as words, phrases, and/or sentences, for example and without limitation. At step 1106, VCA 226 queries database 228 to identify a command specification 460 corresponding to the sample metadata. VCA 226 may perform a fuzzy string search or other approach for matching strings of linguistic elements. At step 1108, VCA 226 extracts one or more functions from the located command specification. The one or more functions generally correspond to individual operations that vehicle 110 can perform. At step 1110, VCA 226 initiates execution of the extracted functions via vehicle interface 512 to cause vehicle 110 to perform the corresponding operations.

In sum, a voice command application allows a user to configure an infotainment system to respond to customized voice commands. The voice command application exposes a library of functions to the user which the infotainment system can execute via interaction with the vehicle. The voice command application receives a selection of one or more functions and then receives a speech sample of the voice command. The voice command application generates sample metadata that includes linguistic elements of the voice command, and then generates a command specification. The command specification indicates the selected functions and the sample metadata for storage in a database. Subsequently, the voice command application receives the voice command from the user and locates the associated command specification in the database. The voice command application then extracts the associated set of functions and causes the vehicle to execute those functions to perform vehicle operations At least one advantage of the disclosed techniques is that because the user of the voice command application personally generates the voice command specifications, the user is naturally familiar with what voice commands are available and need not consult a manual to learn those commands. Another advantage is that because the voice commands are specified based on speech samples gathered directly from the user, the voice command application is able to recognize those commands with a greater degree of accuracy compared to conventional speech interfaces. Yet another advantage of the disclosed techniques is that voice command specifications can be generated and/or updated to include wording variations and/or grammatical variations as desired by the user, without requiring a firmware update. Another advantage is that the set of available voice commands can be expanded to include any combination of available vehicle functions, without needing a firmware update.

1. Some embodiments if the invention include: a computer-implemented method for configuring a vehicle infotainment system to initiate at least one vehicle operation in response to a voice command, the method comprising: querying a database to obtain a library of vehicle functions, wherein each vehicle function, when executed, causes a subsystem within a vehicle to perform a corresponding vehicle operation, receiving a selection of a first set of vehicle functions from the library of vehicle functions, receiving a first speech sample associated with a user, identifying a first linguistic element included in the first speech sample, and generating a voice command specification that includes the first set of vehicle functions and the first linguistic element.

2. The computer-implemented method of clause 1, further comprising recording a human vocalization received from the user to generate the first speech sample.

3. The computer-implemented method of any of clauses 1 and 2, wherein identifying the first linguistic element comprises identifying at least one of a word, a phrase, and a sentence included in the speech sample using a speech recognition algorithm.

4. The computer-implemented method of any of clauses 1, 2, and 3, further comprising updating the database to include the voice command specification.

5. The computer-implemented method of any of clauses 1, 2, 3, and 4, further comprising: determining that a second speech sample associated with the user includes the first linguistic element, querying the database to identify the voice command specification based on the first linguistic element, parsing the voice command specification to extract the first set of vehicle functions, and causing the vehicle infotainment system to initiate the at least one vehicle operation based on the first set of vehicle functions.

6. The computer-implemented method of any of clauses 1, 2, 3, 4, and 5, wherein causing the vehicle infotainment system to initiate the at least one vehicle operation comprises causing the vehicle infotainment system to execute each function in the set of functions.

7. The computer-implemented method of any of clauses 1, 2, 3, 4, 5, and 6, wherein the database resides within a mobile device and is synchronized with another database included in the vehicle, and the selection of the first set of vehicle functions is received via a graphical user interface generated via the mobile device.

8. The computer-implemented method of any of clauses 1, 2, 3, 4, 5, 6, and 7, wherein the database resides within the vehicle, and the selection of the first set of vehicle functions is received via a graphical user interface generated via the vehicle infotainment system.

9. Some embodiments if the invention include: a non-transitory computer-readable medium that, when executed by a processor, causes the processor to initiate at least one vehicle operation in response to a voice command, by performing the steps of: querying a database to obtain a library of vehicle functions, wherein each vehicle function corresponds to an operation a vehicle subsystem performs, receiving a selection of a first set of vehicle functions from the library of vehicle functions, receiving a first speech sample associated with a user, identifying a first linguistic element included in the first speech sample, and generating a voice command specification that includes the first set of vehicle functions and the first linguistic element.

10. The non-transitory computer-readable medium of clause 9, further comprising the step of recording a human vocalization received from the user to generate the first speech sample.

11. The non-transitory computer-readable medium of any of clauses 9 and 10, wherein the step of identifying the first linguistic element comprises identifying at least one of a word, a phrase, and a sentence included in the speech sample using a speech recognition algorithm.

12. The non-transitory computer-readable medium of any of clauses 9, 10, and 11, further comprising the steps of: determining that a second speech sample associated with the user includes the first linguistic element, querying the database to identify the voice command specification based on the first linguistic element, parsing the voice command specification to extract the first set of vehicle functions, and causing the vehicle infotainment system to initiate the at least one vehicle operation based on the first set of vehicle functions.

13. The non-transitory computer-readable medium of any of clauses 9, 10, 11, and 12, wherein the step of causing the vehicle infotainment system to initiate the at least one vehicle operation comprises causing the vehicle infotainment system to execute each function in the set of functions.

14. The non-transitory computer-readable medium of any of clauses 9, 10, 11, 12, and 13, wherein the first set of vehicle functions includes at least two vehicle functions that are executed to initiate at least two corresponding vehicle operations.

15. The non-transitory computer-readable medium of any of clauses 9, 10, 11, 12, 13, and 14, wherein the at least two corresponding vehicle operations are performed serially in response to execution of the at least two vehicle functions.

16. The non-transitory computer-readable medium of any of clauses 9, 10, 11, 12, 13, 14, and 15, wherein the at least two corresponding vehicle operations are performed in parallel with one another in response to execution of the at least two vehicle functions.

17. Some embodiments if the invention include: a system for configuring a vehicle infotainment system to initiate at least one vehicle operation in response to a voice command, comprising: a memory storing a voice command application, and a processor that, upon executing the voice command application, performs the steps of: querying a database to obtain a library of vehicle functions, wherein each vehicle function, when executed, causes a subsystem of a vehicle to perform a corresponding vehicle operation, receiving a selection of a first set of vehicle functions from the library of vehicle functions, identifying a first linguistic element included in a first speech sample associated with a user, and generating a voice command specification that includes the first set of vehicle functions and the first linguistic element for storage in the database.

18. The system of clause 17, wherein the processor and the memory reside within a mobile device wirelessly coupled to the vehicle infotainment system, the database is included in the memory and is synchronized with another database included in the vehicle infotainment system, and the selection of the first set of vehicle functions is received via a graphical user interface generated via the mobile device.

19. The system of any of clauses 17 and 18, wherein the processor and the memory reside within the vehicle infotainment system, the database is included in the memory, and the selection of the first set of vehicle functions is received via a graphical user interface generated via the vehicle infotainment system.

20. The system of any of clauses 17, 18, and 19, wherein the processor and the memory are included in a mobile device wirelessly coupled to the vehicle, the database is included in another memory included in the vehicle infotainment system, and the mobile device queries the database, obtains the selection of the first set of vehicle functions, determines that the first speech sample includes the first linguistic element, and generates the voice command specification.

Any and all combinations of any of the claim elements recited in any of the claims and/or any elements described in this application, in any fashion, fall within the contemplated scope of the various embodiments and the contemplated scope of protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for configuring a vehicle infotainment system to include a new voice command specification to initiate at least one vehicle operation in response to a voice command, the method comprising:
   querying a database to obtain a library of vehicle functions, wherein each vehicle function, when executed, causes a subsystem within a vehicle to perform a corresponding vehicle operation;
   receiving, via a graphical user interface, a user selection of a first set of vehicle functions from the library of vehicle functions;
   receiving a first speech sample associated with a user;
   identifying a first linguistic element included in the first speech sample;
   generating a first voice command specification that maps the first set of vehicle functions and the first linguistic element; and
   storing, in the database as a new entry, the first voice command specification, wherein, upon identifying the first linguistic element from a second speech sample, the first voice command specification is accessed from the database.

2. The computer-implemented method of claim 1, further comprising recording a human vocalization received from the user to generate the first speech sample.

3. The computer-implemented method of claim 1, wherein identifying the first linguistic element comprises identifying, using a speech recognition algorithm, at least one of: a word included in the first speech sample, a phrase included in the first speech sample, or a sentence included in the first speech sample.

4. The computer-implemented method of claim 1, further comprising:
  determining that the second speech sample associated with the user includes the first linguistic element;
  querying the database using the first linguistic element to identify the first voice command specification;
  parsing the first voice command specification to extract the first set of vehicle functions; and
  causing the vehicle infotainment system to initiate the at least one vehicle operation based on the first set of vehicle functions.

5. The computer-implemented method of claim 4, wherein causing the vehicle infotainment system to initiate the at least one vehicle operation comprises causing the vehicle infotainment system to execute each function in the first set of vehicle functions.

6. The computer-implemented method of claim 1, wherein the database resides within a mobile device and is synchronized with another database included in the vehicle, and the graphical user interface is generated via the mobile device.

7. The computer-implemented method of claim 1, wherein the database resides within the vehicle, and the graphical user interface is generated via the vehicle infotainment system.

8. One or more non-transitory computer-readable media storing instructions that, when executed by one or more processors, cause the one or more processors to include a new voice command specification to initiate at least one vehicle operation in response to a voice command, by performing the steps of:
  querying a database to obtain a library of vehicle functions, wherein each vehicle function corresponds to an operation a vehicle subsystem performs;
  receiving, via a graphical user interface, a user selection of a first set of vehicle functions from the library of vehicle functions;
  receiving a first speech sample associated with a user;
  identifying a first linguistic element included in the first speech sample;
  generating a first voice command specification that maps the first set of vehicle functions and the first linguistic element; and
  storing, in the database as a new entry, the first voice command specification, wherein, upon identifying the first linguistic element from a second speech sample, the first voice command specification is accessed from the database.

9. The one or more non-transitory computer-readable media of claim 8, further comprising instructions that cause the one or more processors to perform the step of recording a human vocalization received from the user to generate the first speech sample.

10. The one or more non-transitory computer-readable media of claim 8, wherein the identifying the first linguistic element comprises identifying, using a speech recognition algorithm, at least one of: a word included in the first speech sample, a phrase included in the first speech sample, or a sentence included in the first speech sample.

11. The one or more non-transitory computer-readable media of claim 8, further comprising the steps of:
  determining that the second speech sample associated with the user includes the first linguistic element;
  querying the database using the first linguistic element to identify the first voice command specification;
  parsing the first voice command specification to extract the first set of vehicle functions; and
  causing a vehicle infotainment system to initiate the at least one vehicle operation based on the first set of vehicle functions.

12. The one or more non-transitory computer-readable media of claim 11, wherein causing the vehicle infotainment system to initiate the at least one vehicle operation comprises causing the vehicle infotainment system to execute each function in the first set of vehicle functions.

13. The one or more non-transitory computer-readable media of claim 11, wherein the first set of vehicle functions includes at least two vehicle functions that are executed to initiate at least two corresponding vehicle operations.

14. The one or more non-transitory computer-readable media of claim 13, wherein the at least two corresponding vehicle operations are performed serially in response to execution of the at least two vehicle functions.

15. The one or more non-transitory computer-readable media of claim 13, wherein the at least two corresponding vehicle operations are performed in parallel with one another in response to execution of the at least two vehicle functions.

16. A system for configuring a vehicle infotainment system to include a new voice command specification to initiate at least one vehicle operation in response to a voice command, comprising:
  a memory storing a voice command application; and
  a processor that, upon executing the voice command application, performs the steps of:
    querying a database to obtain a library of vehicle functions, wherein each vehicle function, when executed, causes a subsystem of a vehicle to perform a corresponding vehicle operation,
    receiving, via a graphical user interface, a user selection of a first set of vehicle functions from the library of vehicle functions,
    identifying a first linguistic element included in a first speech sample associated with a user,
    generating a first voice command specification that maps the first set of vehicle functions and the first linguistic element, and
    storing, in the database as a new entry, the first voice command specification, wherein, upon identifying the first linguistic element from a second speech sample, the first voice command specification is accessed from the database.

17. The system of claim 16, wherein:
  the processor and the memory reside within a mobile device wirelessly coupled to the vehicle infotainment system,
  the database is included in the memory and is synchronized with another database included in the vehicle infotainment system, and
  the graphical user interface is generated via the mobile device.

18. The system of claim 16, wherein:
  the processor and the memory reside within the vehicle infotainment system,
  the database is included in the memory, and
  the graphical user interface is generated via the vehicle infotainment system.

19. The system of claim 16, wherein:
the processor and the memory are included in a mobile device wirelessly coupled to the vehicle,
the database is included in another memory included in the vehicle infotainment system, and
the mobile device:
   queries the database,
   obtains the user selection of the first set of vehicle functions,
   determines that the first speech sample includes the first linguistic element, and
   generates the first voice command specification.

\* \* \* \* \*